(12) United States Patent
Yokota et al.

(10) Patent No.: US 6,356,837 B1
(45) Date of Patent: Mar. 12, 2002

(54) NAVIGATION SYSTEM

(75) Inventors: Tatsuo Yokota, Torrance; Hikaru Wako, Redondo Beach, both of CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/813,230

(22) Filed: Mar. 19, 2001

(51) Int. Cl.[7] .............................................. G06F 165/00
(52) U.S. Cl. ........................ 701/208; 701/213; 701/210
(58) Field of Search ................................. 701/208, 209, 701/21, 212, 213, 207, 25

(56) References Cited

U.S. PATENT DOCUMENTS

| | | | |
|---|---|---|---|
| 4,897,792 A | 1/1990 | Hosoi | |
| 5,189,430 A | 2/1993 | Yano et al. | |
| 6,253,150 B1 | * 6/2001 | Nakamura | 701/208 |
| 6,269,305 B1 | * 7/2001 | Yamashita | 701/209 |
| 6,278,938 B1 | * 8/2001 | Alumbaugh | 701/208 |
| 6,289,278 B1 | * 9/2001 | Endo et al. | 702/208 |
| 6,292,749 B2 | * 9/2001 | Kohli | 701/213 |

* cited by examiner

*Primary Examiner*—Richard M. Camby
(74) *Attorney, Agent, or Firm*—Brinks Hofer Gilson & Lione

(57) ABSTRACT

A travel state monitoring unit monitors whether the vehicle position deviates from a road so as to be in the off-road travel state, on the basis of the map information and the vehicle position. When the vehicle position is in the off-road state, a travel trail generating unit generates off-road travel trail data and stores the data in an off-road travel trail storage unit. A display control unit displays, by the user's instruction, the off-road travel trail superimposed with the map, using the off-road travel trail data. The route search unit searches a route to an off-road point and displays the route.

27 Claims, 13 Drawing Sheets

FUNCTIONAL BLOCK DIAGRAM OF THE NAVIGATION SYSTEM ACCORDING TO THE INVENTION

FIG. 3
CONSTRUCTION OF THE ADDRESS BOOK MEMORY
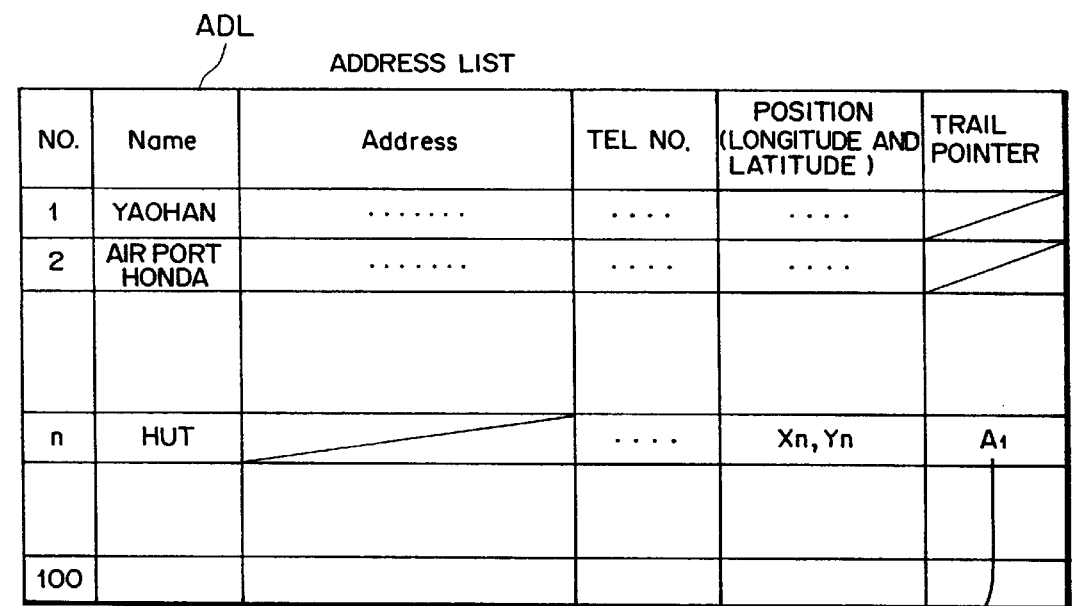
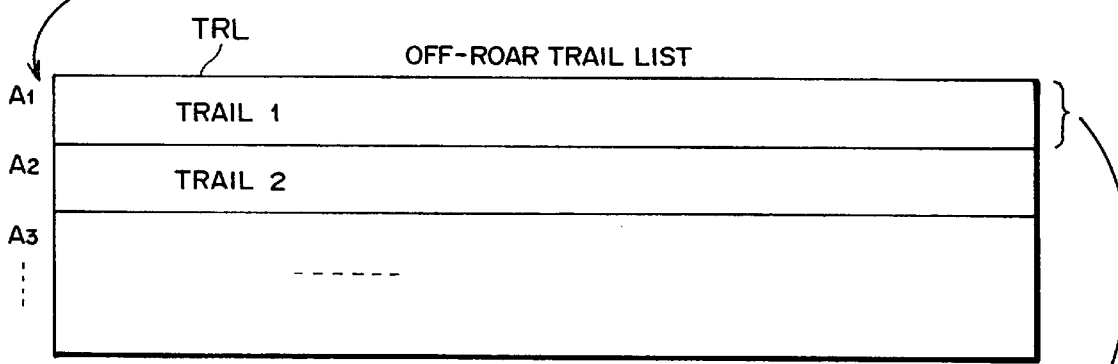

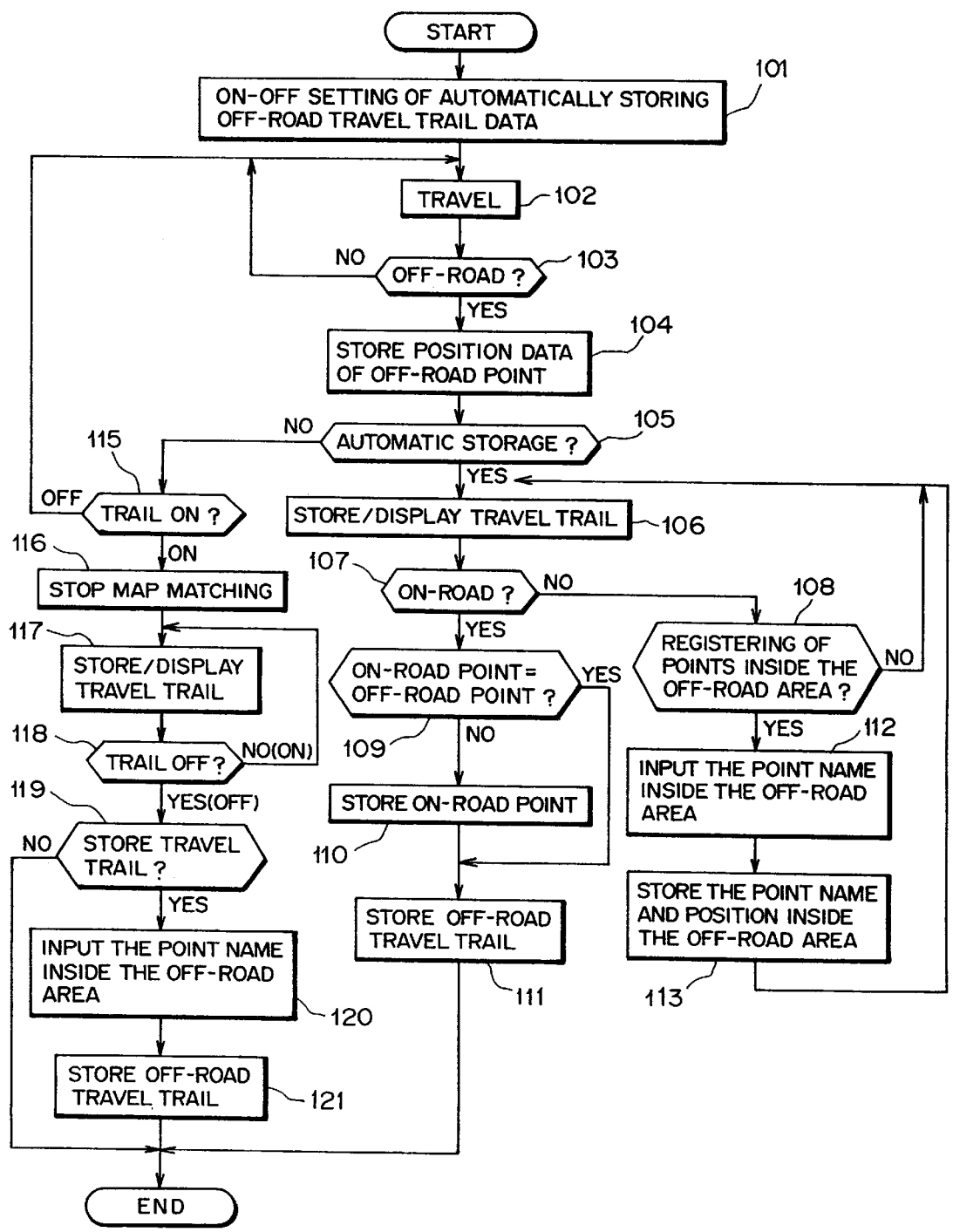

EXAMPLE OF SETTING THE STORAGE METHOD (Auto / Manual) OF OFF-ROAD TRAVEL TRAIL DATA

DISPLAY EXAMPLE (NO.1) OF A TRAVEL TRAIL

DISPLAY EXAMPLE (NO. 2) OF A TRAVEL TRAIL

WHEN THE OFF-ROAD POINT DIFFERS FROM THE ON-ROAD POINT

IN CASE OF A BRANCHED TRAVEL

PROCESSING FLOW OF STORING BRANCHED TRAVEL TRAIL DATA

EXAMPLE OF DISPLAY ON/OFF SETTING OF AN OFF-ROAD TRAVEL TRAIL

DISPLAY EXAMPLE OF EDITING THE Address Book

EXPLANATORY CHART OF THE DESTINATION INPUT METHOD BY THE Address Book

NAVIGATION SYSTEM

BACKGROUND OF THE INVENTION

The present invention relates to a navigation system, more specifically to a navigation system that stores trail data of a vehicle traveling off-road, displays the off-road travel trail of the vehicle appropriately on a display screen, and sets a destination by means of the off-road travel trail data.

A navigation system detects the position of a vehicle and reads out map data of the area surrounding the vehicle from a map storage medium such as a CD-ROM or a DVD, displays the image of the map data on a display screen, and superimposes a vehicle mark (the user's own vehicle mark) with the map image at a specified position on the display screen. As the current position of the vehicle varies with the movement thereof, the navigation system moves the vehicle mark on the screen, or fixes the vehicle mark at a specific position such as the screen center and scrolls the map image, so that the driver can recognize the map information surrounding the vehicle position at a glance.

This type of navigation system is provided with a travel route display function that superimposes the route on which the vehicle traveled in the past with the map image on the screen. The travel route display function stores the vehicle position (longitude and latitude) in a travel route memory as discrete travel route data, each time the vehicle position detected by the vehicle position detector varies by a constant distance, while drawing the map image on the screen, selects data to be taken in as the map image data from the discrete travel route data stored in the travel route memory, and identifiably draws the map image by changing the sequence of points or the color at a corresponding position on the map image.

Therefore, because it can display the route on which the vehicle traveled in the past with the sequence of points on the road in the display screen, the navigation system having the travel route display function can easily bring the driver back to the point of departure, for example, by tracing back the travel route on the return, even if the driver travels to an unfamiliar place. In addition, if the driver travels again to the same place later, the driver can easily reach the place on the outward journey by re-tracing the travel route.

However, the conventional navigation system stores the travel route only when traveling on roads, and does not have a function to store the travel route when traveling in off-road areas and display the travel route in the off-road areas. In the United States, for example, which has vast natural terrain, many users of the navigation system travel off-road. For example, they go deep in the mountains by jeep to camp or hunt deer or pheasants, they drive about in the desert or wilderness where no roads are available, they go to summer cabins without accessible roads deep in the mountains, and the like. On some later occasions, they may return to the cabin, campground or hunting area, where they once traveled. However, since the conventional navigation system does not have a function to store the travel trail in the off-road areas, it has been difficult for users to reach the cabins or campgrounds. That is, the off-road travelers have a desire to store the off-road trails, to view the trails afterwards, and to re-trace the trails once again, which the conventional navigation system could not do.

SUMMARY OF THE INVENTION

It is therefore an object of the invention to provide a navigation system that displays an off-road travel trail afterwards.

Another object of the invention is to make it possible to store an off-road travel trail automatically or only when a user instructs, and to read out and display a desired travel trail afterwards.

Another object of the invention is to make it possible to automatically store an off-road travel trail from an off-road point (entry point to an off-road area from an on-road area) to an on-road point (entry point to an on-road area from an off-road area).

Another object of the invention is to make it possible, when the vehicle travels along an off-road travel trail and deviates from the off-road travel trail, to automatically store the travel trail after the deviation.

Another object of the invention is to make it possible to register an off-road point and an on-road point as an entrance to the off-road trail to thereby search and display a guide route to a specific off-road entrance.

Another object of the invention is to make it possible to register an off-road travel trail in association with a place name of a destination or transit point on the off-road travel, to thereby set a destination easily from a list of the place names afterwards and display the map or the travel trail surrounding the set destination afterwards.

Another object of the invention is to make it possible, when a place name as a destination of an off-road travel trail is set, to search and display a guide route to the off-road entrance, or to call a facility associated with the place name by a mobile telephone.

Another object of the invention is to make it possible to display a remaining capacity of the memory that stores the travel trail, for example, by a distance.

The navigation system of the invention includes: (1) a position measurement unit that detects the user's own vehicle position, (2) a monitoring unit that monitors whether the vehicle position deviates from a road so as to be in an off-road state, (3) a travel trail generating unit that generates off-road travel trail data, when the vehicle is in the off-road state, and (4) a storage unit that stores the travel trail data. That is, the navigation system of the invention stores the off-road travel trail data in memory, and the user is able to read out desired off-road travel trail data and to display the travel trail appropriately.

In another aspect of the navigation system of the invention, in storing the travel trail data, the user sets whether to generate the off-road travel trail data automatically or to generate the data by an instruction from the user. If the setting is automatic, when the vehicle is in the off-road state, the system automatically generates and stores the off-road travel trail data from the off-road point to the on-road point. With this construction, the system achieves enhanced maneuverability and secure storage of the off-road travel trail. On the other hand, if the setting is to generate the data by an instruction from the user, the system begins to generate the off-road travel trail data by a generation starting instruction, and terminates the generation of the off-road travel trail data by a generation terminating instruction, and stores the data. With this construction, the system does not produce the travel trail data when the vehicle is in an area where the travel trail is not needed to be stored, such as shopping malls, public gardens, etc. Therefore, the system achieves effective use of the memory and does not store unnecessary travel trail data, and the user is able to easily retrieve and/or edit the data afterwards.

In another aspect of the navigation system of the invention, when the user travels along an off-road travel trail and the vehicle position deviates (branches) from the off-road travel trail, the system produces the position data of the branch point and the travel trail data after branching in association with the name of the branch point, and stores these data. With this construction, the user is able to search the destination by entering the branch point.

Further, since the navigation system of the invention can register an off-road point and an on-road point as an off-road entrance, the user can select either one of them and cause the system to search and display a guide route to a specific off-road entrance.

Moreover, since the navigation system of the invention can register an off-road travel trail in association with the destination of an off-road travel or the place name of a transit point on the off-road travel, the user is able to set the destination easily from a list of place names, and to display the map and the travel trail surrounding the destination thus set.

In another aspect of the navigation system of the invention, when the user selects the destination of an off-road travel or the place name of a transit point on an off-road travel and instructs a call, the system causes the automobile telephone to call a facility at that location. Thus, the user is able to call facilities located inside the off-road area with an easy operation.

Further, the navigation system of the invention monitors the remaining capacity of the memory to store travel trail data, and displays the remaining capacity by means of a storable remaining point number or a storable remaining distance. Thus, the user is able to delete unnecessary off-road travel trail data by editing, when the remaining memory capacity diminishes, and to store only the necessary trail data.

Other features and advantages of the present invention will be apparent from the following description taken in conjunction with the accompanying drawings.

BRIEF DESCRIPTION OF SEVERAL VIEWS OF THE DRAWINGS

FIG. 3 is a chart illustrating a construction of an address book memory;

FIG. 4 is a flow chart of the storage processing of an off-road travel trail;

DESCRIPTION OF THE PREFERRED EMBODIMENTS

(A) Outline Of The Invention

Figure 1:
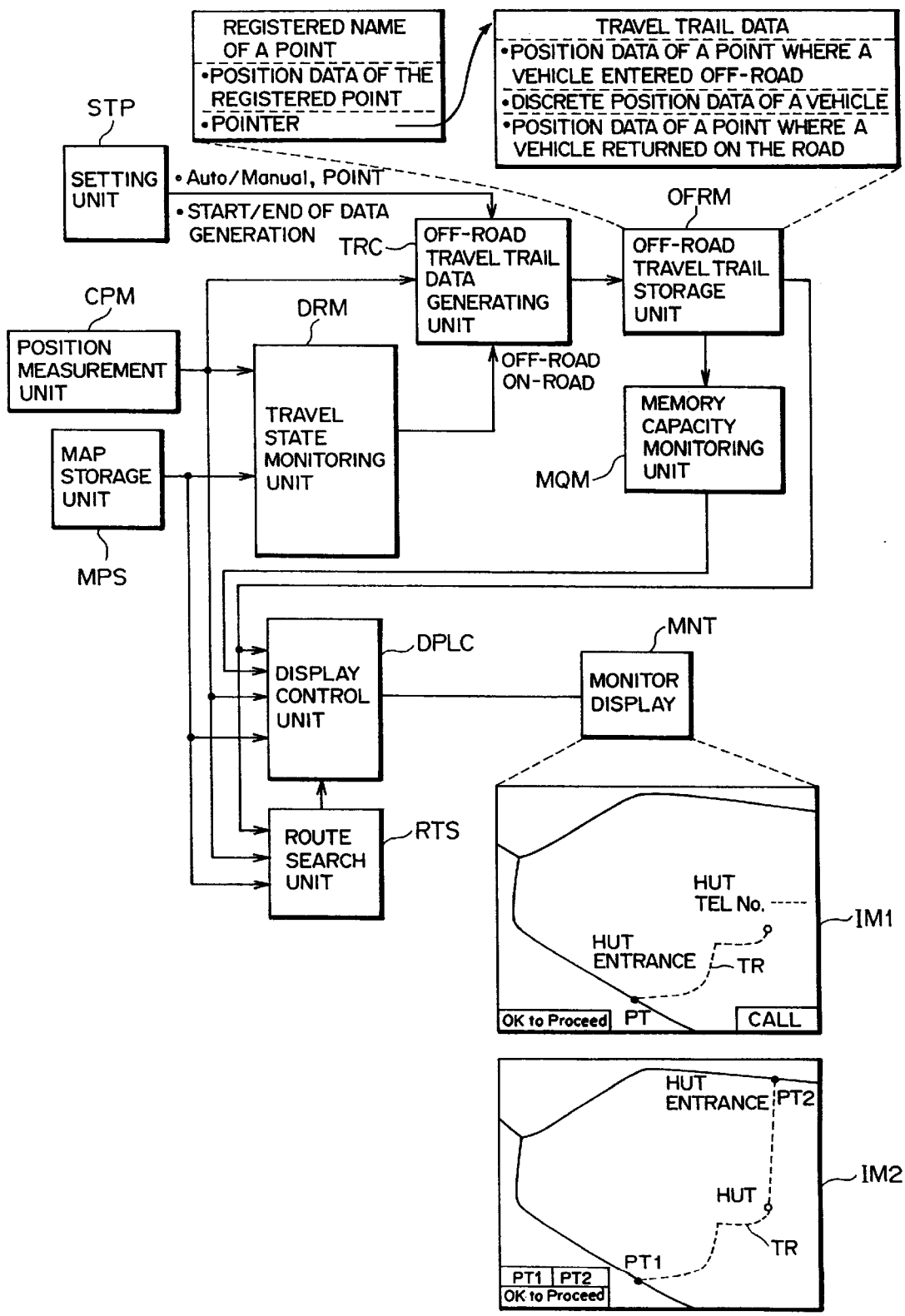
FIG. 1 is a functional block diagram of a navigation system according to the invention.

FIG. 1 is a functional block diagram of a navigation system according to the invention. The navigation system includes (1) a map storage unit MPS that stores map data, (2) a position measurement unit CPM that measures a position of the vehicle, (3) a travel state monitoring unit DRM that monitors the travel state of the vehicle, i.e., whether it is traveling off the road (off-road travel state) or has returned to the road (on-road travel state), (4) a travel trail data generating unit TRC that generates off-road travel trail data when the travel state becomes the off-road travel state, (5) a travel trail storage unit OFRM that stores off-road travel trail data, (6) a setting unit STP that executes various settings, (7) a memory capacity monitoring unit MQM that monitors the remaining memory capacity of the off-road travel trail storage unit OFRM, (8) a display control unit DPLC that generates a map, off-road travel trail, vehicle mark, searched route, etc., (9) a route search unit RTS that searches a route to a destination, and (10) a monitor display MNT.

The setting unit STP sets whether to generate off-road travel trail data automatically (Auto) or manually by the instruction of a user (Manual). If the setting is Auto, the travel trail data generating unit TRC generates the off-road travel trail data automatically, when the vehicle is off-road, and stores it in the travel trail storage unit OFRM. That is, the travel state monitoring unit DRM monitors whether the vehicle position is off-road or has returned to the road (on-road), and the travel trail data generating unit TRC automatically generates for storage travel trail data from the off-road point to the on-road point in accordance with the monitored result. The off-road travel trail storage unit OFRM stores (1) a destination in an off-road area or the name of a point (registered name of a point) as a transit point during an off-road travel, which is inputted by the setting unit STP, (2) position data for the registered point, and (3) a pointer indicating a stored position of the travel trail data. The travel trail data include (1) position data of the point where the vehicle entered off-road, (2) discrete vehicle position data for each specific travel distance, and (3) position data of the point where the vehicle returned on-road.

When generating travel trail data by the instruction from the user, the travel trail data generating unit TRC begins to generate off-road travel trail data in accordance with the generation start instruction from the setting unit STP, terminates the generation of the off-road travel trail data in accordance with the generation termination instruction, and stores the data in the travel trail storage unit OFRM. Here, in association with the name of a point inputted on the start instruction or on the termination instruction, the travel trail data generating unit TRC causes the travel trail storage unit OFRM to store (1) the position data of the point, and (2) the travel trail data (the position data of the point where the vehicle entered off-road, and the discrete position data of the vehicle for each specific travel distance).

The display control unit DPLC causes the monitor display MNT to display a list of the names of points stored in the travel trail storage unit OFRM by an instruction from the setting unit STP. Further, the display control unit DPLC causes the monitor display MNT to display an image IM1 including the map surrounding the point (for example, a hut) that the user selected from the list, the off-road travel trail TR, and the name of the point (HUT). When the name of the point (HUT) selected by the user is set as the destination, the route search unit RTS searches the route to the off-road point PT (HUT ENTRANCE) that is stored in association with the name of the point and displays the route. When the point (HUT) is set as the destination, if an off-road point PT1 and an on-road point PT2 corresponding to the name of the point (HUT) are each stored as entrances to the destination, as shown in image IM2, the user can select either one of them, and the route search unit RTS will search the route to the selected point for display. Further, when a point is set as the receiving station for a portable telephone or the like (CALL), the telephone number stored in association with the name of the point is inputted to the mobile telephone.

The setting unit STP sets whether or not to superimpose the off-road travel trail stored in the off-road travel trail storage unit OFRM with the map on the display. According to the setting of the display, the display control unit DPLC displays the off-road travel trail, and during travel along the off-road travel trail, the travel state monitoring unit DRM monitors whether the position of the vehicle is off the off-road travel trail. If the vehicle position goes off the off-road travel trail, the travel trail data generating unit TRC will regard the point of deviation from the off-road travel trail as a branch point, will generate the position data of the branch point in association with the name of the branch point and the off-road travel trail after the branch, and will cause the storage unit OFRM to store them.

When the travel trail storage unit OFRM is able to store the vehicle position data for each specific travel distance in the form of a specific point number, the memory capacity monitoring unit MQM monitors the storable remaining point number, and causes the monitor MNT to display the storable remaining point number or the storable remaining travel distance.

(B) Navigation System Of The Invention (a) Overall Construction

Figure 2:
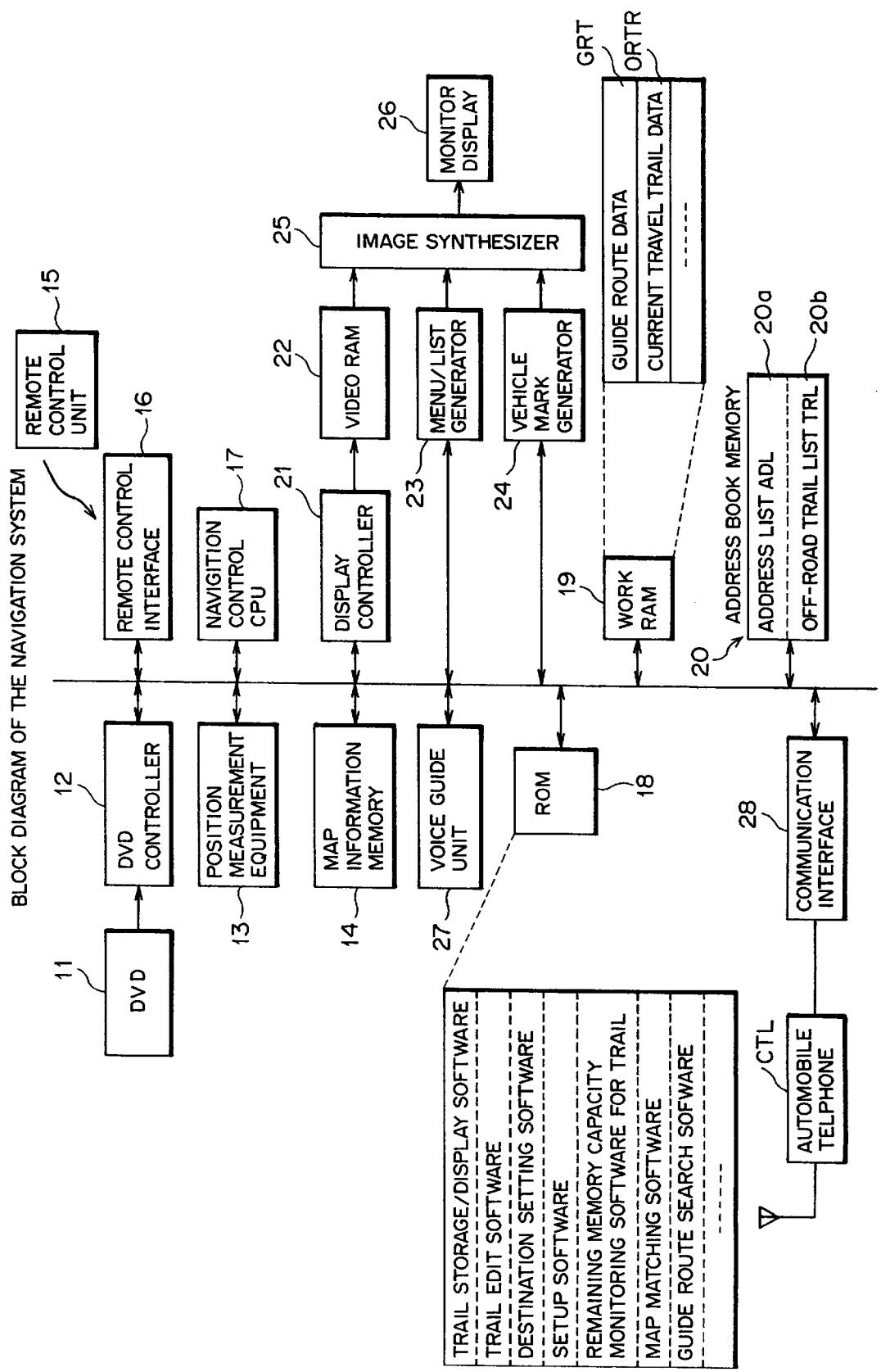
FIG. 2 is a block diagram of a navigation system.

FIG. 2 is a block diagram of a navigation system according to the present invention. In the drawing, 11 signifies a map storage medium, for example, a DVD (digital video disk) that stores map information, 12 a DVD controller that controls the read-out of the map information from the DVD, 13 a position measurement equipment that measures a current position of the vehicle, which includes a speed sensor that detects a distance of movement, an angular velocity sensor that detects an azimuth of a movement, a GPS receiver, and a position calculation CPU, and the like. 14 signifies a map information memory that memorizes map information surrounding the vehicle position, which is read out from the DVD, 15 a remote control unit that executes various settings and instructions according to the menu selection, inputs the names of points and the telephone numbers, and executes operations such as expansion/contraction, etc., and 16 a remote control interface.

17 signifies a CPU (navigation control unit) that controls the entire navigation system, 18 a ROM that stores various software and fixed data, in which the various software include (1) trail storage/display software for off-road travel, (2) trail edit software, (3) destination setting software, (4) setup software for various settings, (5) remaining capacity monitoring software for trail storage memory, (6) map matching software, (7) guide route search software, and the like. 19 signifies a work RAM that temporarily stores the processed results of guide route data GRT and off-road current travel trail data ORTR, etc., 20 an address book memory that stores an address list ADL and an off-road trail list TRL.

Further, 21 signifies a display controller that generates a map image, off-road travel trail, guide route, etc., 22 a video RAM that stores images generated by the display controller, 23 a menu/list generator that generates various menus and lists, 24 a vehicle mark generator that generates the position mark of the user's own vehicle, 25 an image synthesizer that synthesizes various images and outputs, 26 a display (monitor) that displays images outputted from the image synthesizer, 27 a voice guide unit that provides the distance and orientation to an intersection by voice, and 28 a communication interface connected with external mobile telephone CTL.

(b) Address Book

FIG. 3 is a chart illustrating the construction of the address book memory that stores the address list ADL and the off-road trail list TRL. The address list ADL holds, in association with the names of points (the address names), addresses, telephone numbers, position data of points (data of longitude and latitude), and trail pointers that indicate storage locations of travel trail data. The points include points outside the off-road area and points inside the off-road area. The points outside the off-road area are registered by the user while setting the destination, and the points inside the off-road area are registered automatically or by the user during traveling off-road. There do not exist travel trail data for points outside the off-road area (in this case, the trail pointer does not have any meaning), and there do not exist address data for points inside the off-road area. The off-road trail list TRL holds a plurality of off-road travel trails TRAIL 1, TRAIL 2, . . . Each of the off-road travel trails includes (1) a number (point number N) of discrete vehicle position data, (2) discrete vehicle position data (data of latitude and longitude) $P_1$–$P_N$, (3) position data of an off-road point (point of deviation from an on-road travel), (4) position data of an on-road point (point of return from an off-road travel), (5) date of travel, and the like. Here, the system (navigation control unit) recognizes the off-road point and the on-road point as entrances to the off-road area.

(c) Storage Processing Of The Off-Road Travel Trail

Figure 5A:
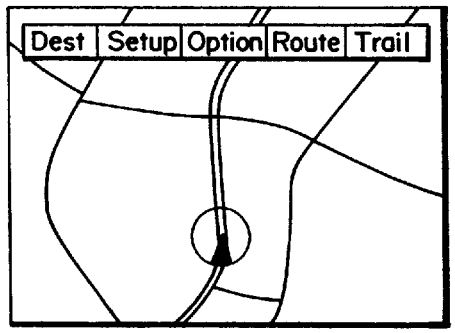
FIG. 5 is an example of setting the storage method (Auto/Manual) of the off-road travel trail data.
Figure 5B:
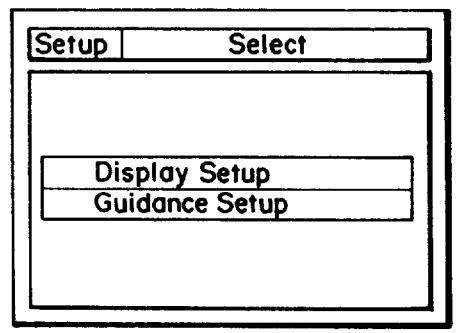
Figure 5C:
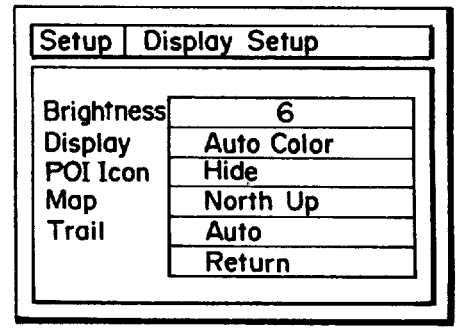
Figure 5D:
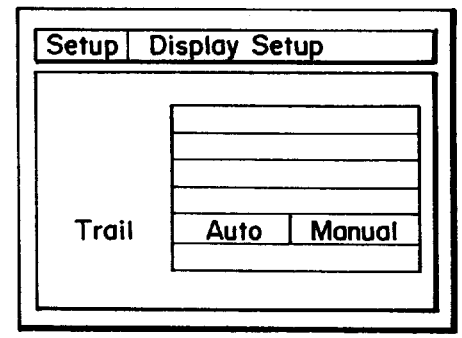

FIG. 4 illustrates a processing flow of storing off-road travel trail data. The user sets in advance whether to automatically generate and register the off-road travel trail, or to generate and store the off-road travel trail only when the user so instructs (step 101). As shown in FIG. 5(A), for example, the user operates the remote control unit and displays the main menu, selects "Setup" to display the submenu in FIG. 5(B), and selects "Display Setup". Then, the system presents the submenu in FIG. 5(C), and the user selects "Trail" to display the submenu "Auto", "Manual" for setting the storage method in FIG. 5(D). The user selects and sets a desired storage method out of "Auto" or "Manual".

After setting the storage method of the off-road travel trail, if the user drives the vehicle (step 102), the navigation control unit 17 will refer to the map and the vehicle position to check whether or not the vehicle goes off-road (step 103). If the vehicle deviates from the road so as to be on an off-road travel, the navigation control unit will store the position data (longitude and latitude) of the off-road point PT1 (see FIG. 6) in the work RAM 19 (step 104), and will check whether the storage method is "Auto" or "Manual" by the user's instruction (step 105).

Figure 6A:
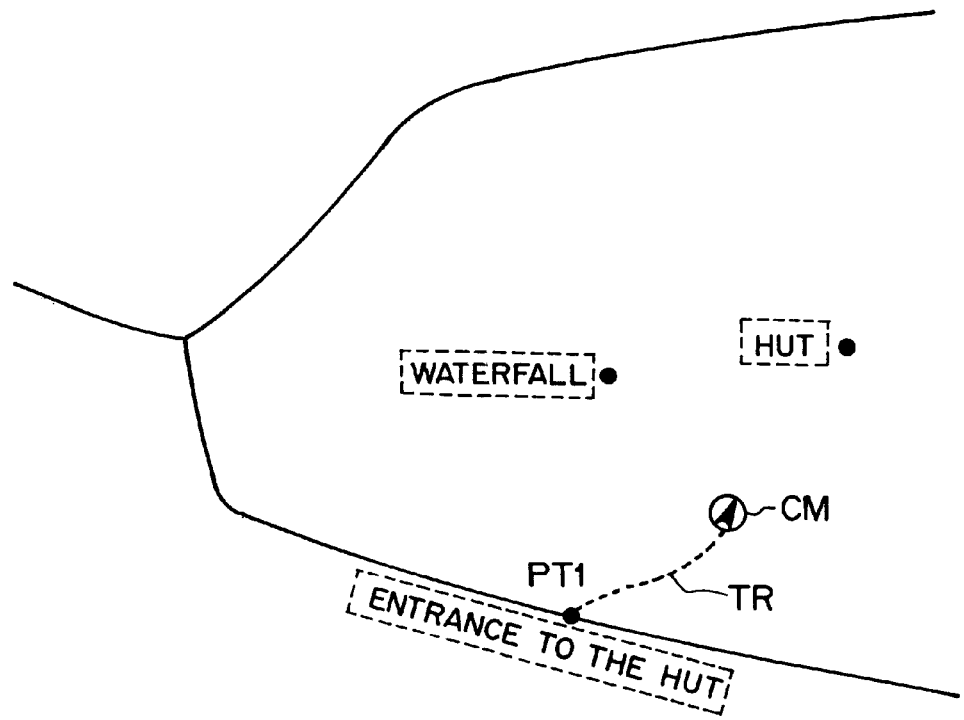
FIG. 6 is a display example (No. 1) of the travel trail.
Figure 6B:
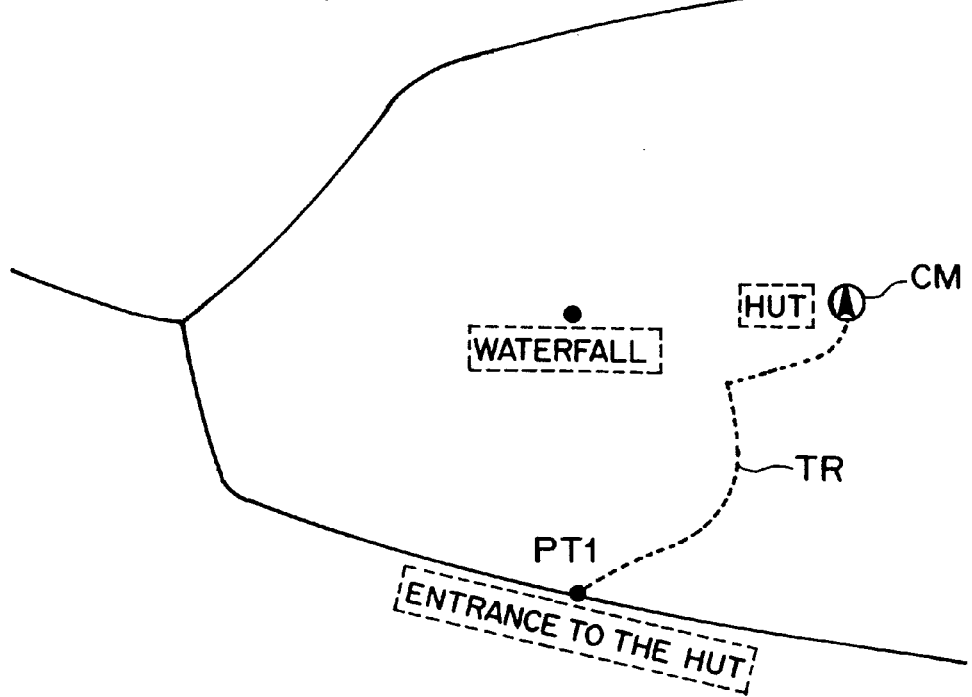

If the user selected "Auto" as the storage method, the system will generate the travel trail data according to the off-road travel, and will display the travel trail on the map with the sequence of points TR as shown in FIG. 6(A), FIG. 6(B) (step 106). Here, obtaining and storing the vehicle position data (longitude and latitude) in the form of discrete data, each time the vehicle moves by a specific distance, for example, 80 m, produces the off-road travel trail data.

Thereafter, the system checks if the vehicle returns on-road (step 107). If not, the system will check if there are registering operations for points inside the off-road area (step 108), and if not, the system repeats the processing from step 106.

Figure 7A:
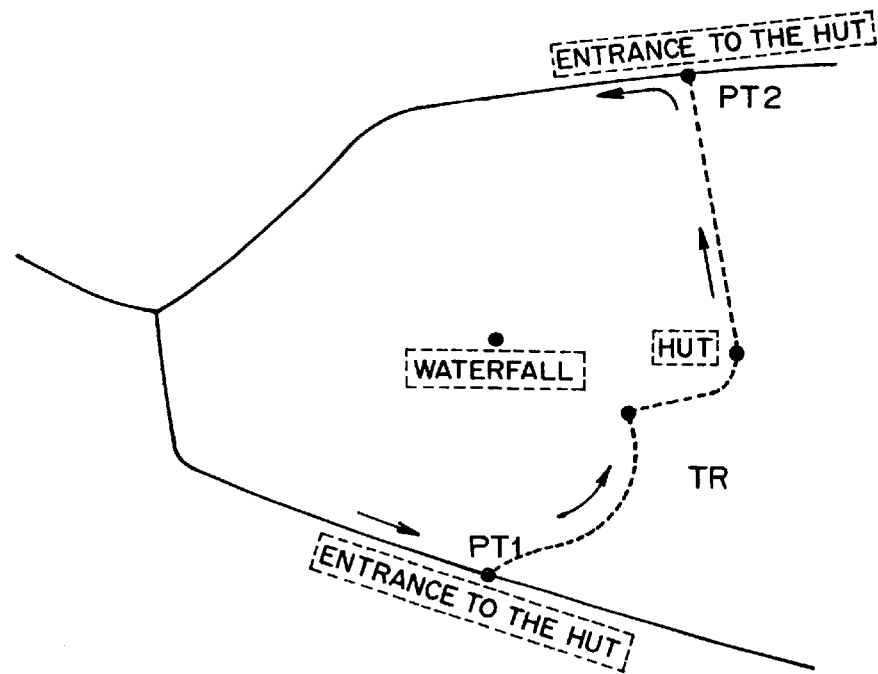
FIG. 7 is a display example (No. 2) of the travel trail.

If the vehicle returns on-road without registering a point (see FIG. 7(A)), the system will check if the on-road point PT2 is identical to the off-road point PT1 (step 109). If not identical, the system will store the position data (longitude and latitude) of the on-road point PT2 in the work RAM, and if identical, the system will not store the position data of the on-road point (step 110). The system then stores the off-road travel trail data from the off-road point PT1 to the on-road point PF2 in the off-road trail list area 20b of the address book memory 20, gives the data an arbitrary name (for example, OFFROAD-1), and stores in the address list area 20a a pointer indicating the off-road travel trail data storage location, in association with the name (step 111), thus terminating the storage processing of the travel trail data.

In the above case, the system did not register a point in the off-road area, but if a point is registered, the system stores the position data of the registered point, trail pointer, and travel trail data, in association with the name of the point. That is, at step 108, if a point registering is made at a specific point inside the off-road area and the name of a point inside the area (for example, HUT) is entered (step 112), the system stores the name of the point and the position of the vehicle at that time in the work RAM 19 (step 113). Thereafter, the system repeats the processing from step 106, and if the vehicle returns on-road, the system will execute the processing at steps 109, 110. At step 111, in association with the registered point name HUT, the system stores (1) the position data of the registered point, (2) trail pointer, and (3) travel trail data. The travel trail data include the position data at the off-road point, the position data at the on-road point, the discrete vehicle position data from the off-road point to the on-road point, the date of travel, etc.

On the other hand, at step 105, if the storage method is not "Auto", the system checks whether the user has instructed the production of travel trail data (TRAIL ON?) (step 115). Here, the selection of the main menu item "TRAIL" (see FIG. 5) sets TRAIL ON, TRAIL OFF in the toggle form. If it is TRAIL OFF, the system will not produce the off-road travel trail and repeats the processing from step 102. But, if it is TRAIL ON, the system will stop the map matching processing (step 116), thereafter produce the off-road travel trail data to store in the work RAM 19, and display on the map the travel trail with the sequence of points as shown in FIG. 6(A), FIG. 6(B) (step 117). The map matching processing returns the vehicle position mark to the road, when the vehicle position mark gets off the road due to the detection errors of the position detection sensor and/or the azimuth detection sensor.

Thereafter, the system checks whether the instruction turns to TRAIL OFF (step 118), and if the answer is "NO", the system will repeat the processing at step 117. If the vehicle reaches the specific destination inside the off-road area and the user sets TRAIL OFF, the system will inquire whether to store the trail data (step 119). If the user inputs not to save the data, the system will annul the off-road travel trail data and terminate the processing.

However, if the user inputs the name (for example, HUT) of the point (registered point) inside the area in order to save the trail data (step 120), the system will store (1) the position data of the registered point and (2) the trail pointer in the address list area 20a in association with the point name HUT, and will store the travel trail data in the trail list area 20b (step 121). The travel trail data include the position data of the off-road point PT1, the discrete vehicle position data from the off-road point to the registered point (HUT), the date of travel, etc. Further, the edit operation permits the user to register telephone numbers.

(d) Register Of The Branched Travel Trail

Figure 8:
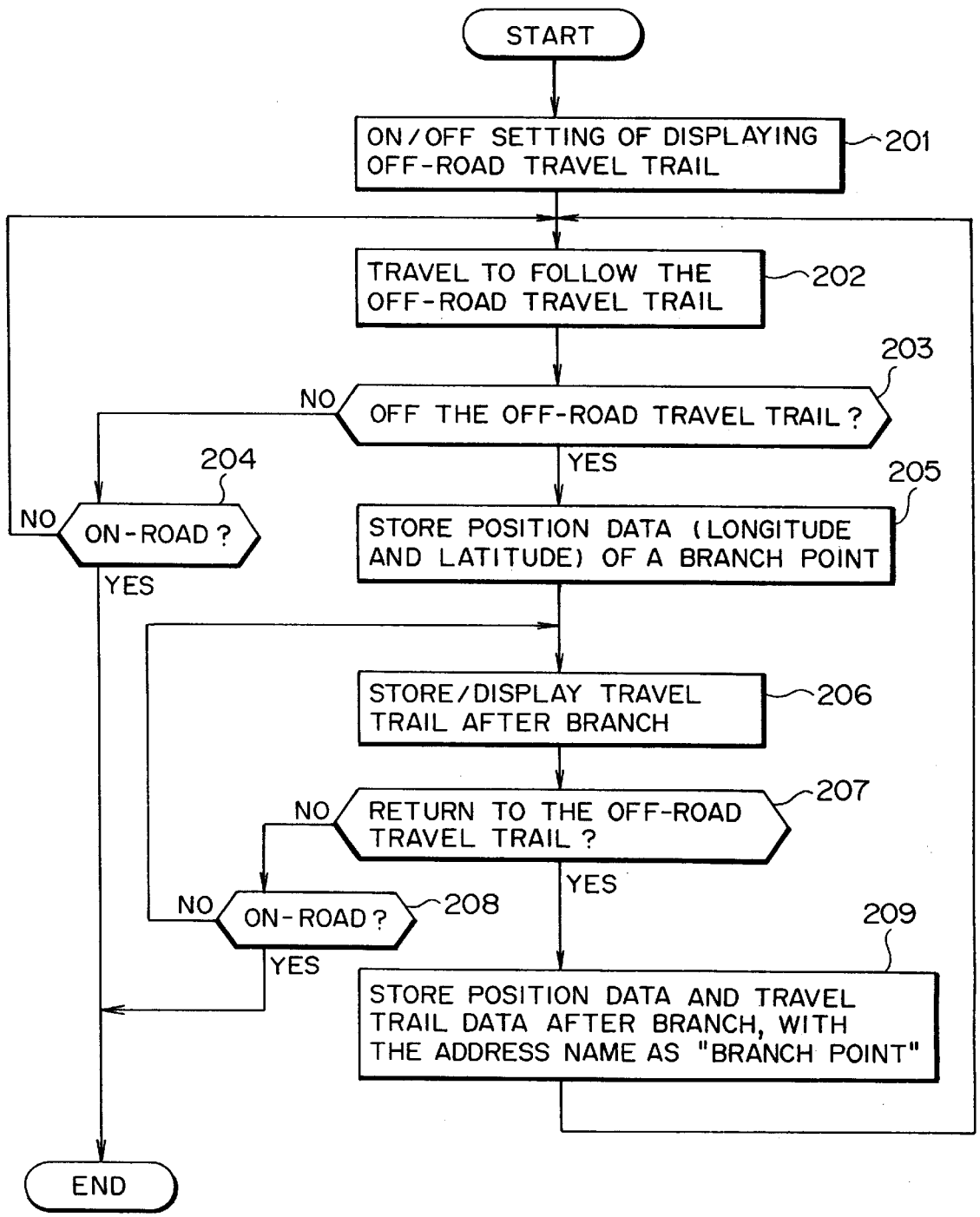
FIG. 8 is a flow chart of the storage processing of a branched travel trail.

FIG. 8 illustrates a processing flow to store a branched travel trail, that is, when the vehicle travels along an off-road travel trail and gets off the off-road travel trail and goes into a branched travel.

Figure 9A:
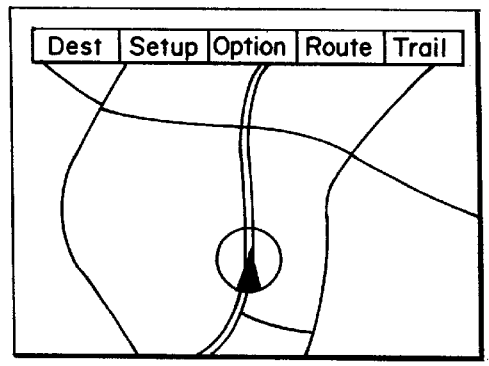
FIG. 9 is an example of the display on/off setting of the off-road travel trail.
Figure 9B:
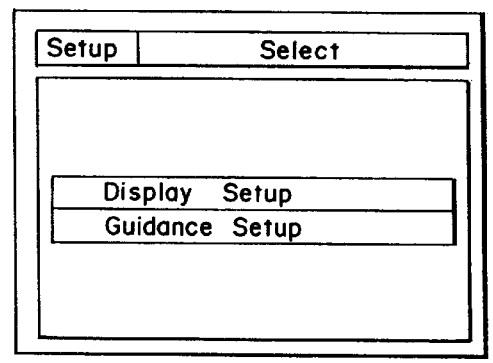
Figure 9C:
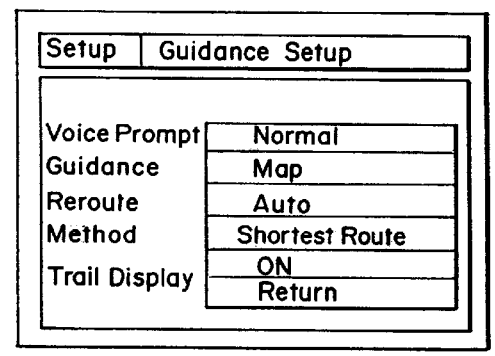
Figure 9D:
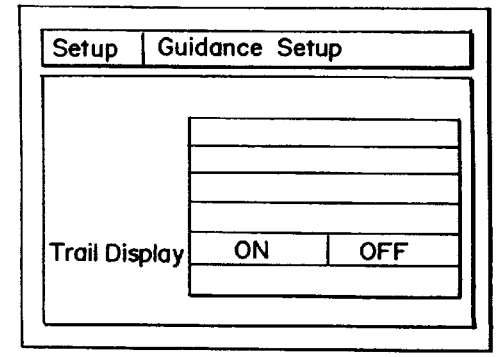

The user sets in advance whether or not to display the off-road travel trail (step 201). As shown in FIG. 9(A), for example, the user operates the remote control unit and displays the main menu, selects "Setup" to display the submenu in FIG. 9(B). Here, if the user selects "Guidance Setup", the system will present the submenu in FIG. 9(C), and the user selects "Trail Display" to present the submenu "ON", "OFF" in FIG. 9(D). The user selects "ON" to display the off-road travel trail, and selects "OFF" to not display it.

Figure 7B:
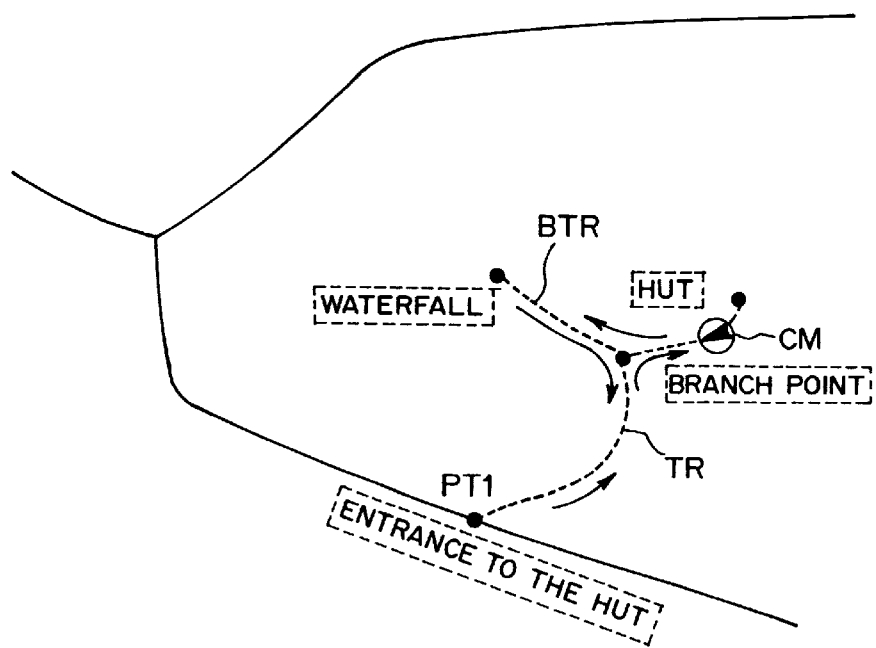

When "ON" is selected and the off-road travel trail is displayed, the user travels along the off-road travel trail (step 202). As shown in FIG. 7(B), for example, the user travels along the off-road travel trail on the return way from the HUT, and accompanied with this travel, the system checks whether the vehicle gets off the off-road travel trail (step 203). If the vehicle does not get off, the system checks whether the vehicle returns on-road (step 204); and if not, the system will repeat the processing from step 202, and if the vehicle returns on-road, the system will terminate the processing.

On the other hand, at step 203, if the vehicle gets off the off-road travel trail and goes to a waterfall, the system will store the position data of the point of branching (the branch point) PB in the work RAM 19 (step 205), thereafter produce data of the travel trail branched to the waterfall to store in the work RAM, and display the branched travel trail BTR (step 206). Next, the system checks whether the vehicle returns to the off-road travel trail (step 207). If it has not returned, the system will check whether the vehicle returns on-road (step 208). If not on-road, the system will repeat the processing from step 206, and if on-road, the system will terminate the processing. On the other hand, if the vehicle returns to the off-road travel trail, the system will store the position data of the branch point and the branched travel trail data with the address name as "branch point" in the address book memory 20 (step 209), and execute the processing from step 202.

(e) Storable Remaining Distance Monitoring Control

Figure 10:
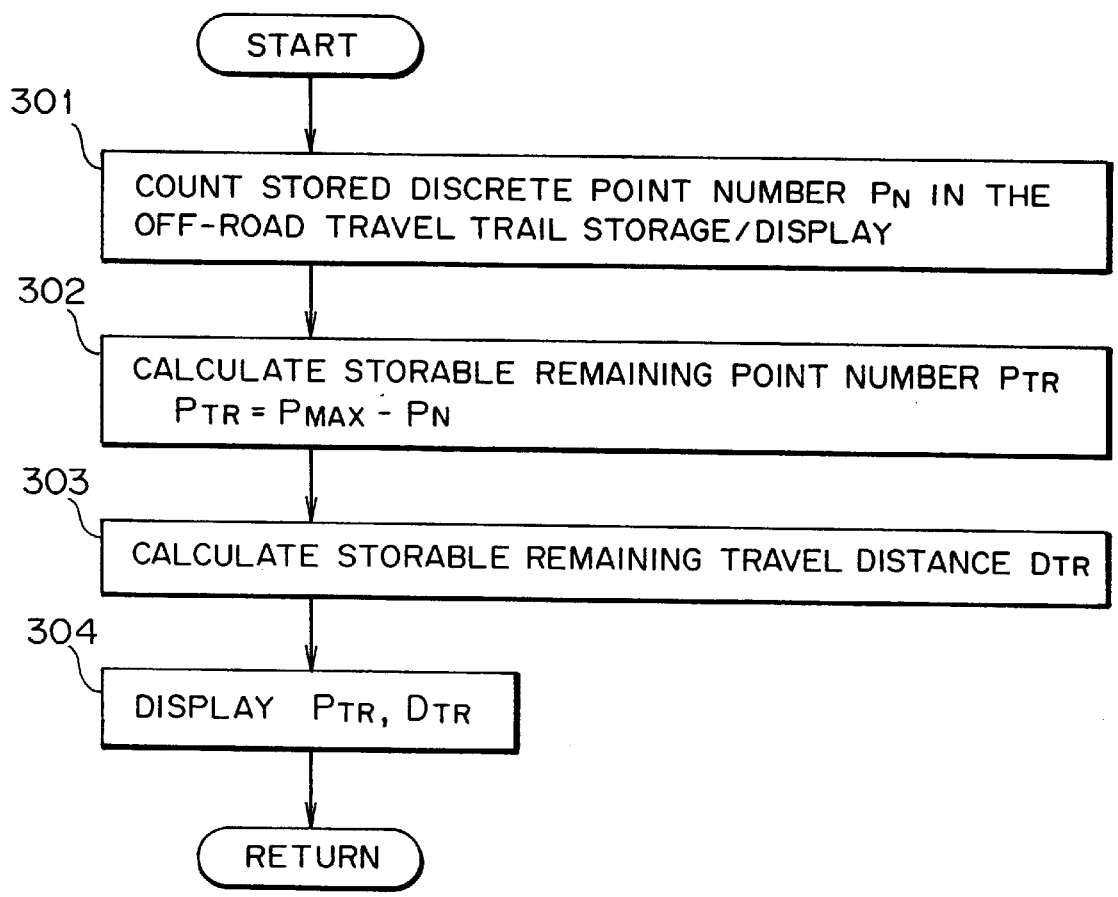
FIG. 10 is a flow chart of monitoring a storable remaining distance in the off-road travel trail storage processing.

FIG. 10 illustrates a monitoring flow of a storable remaining distance in the off-road travel trail storage processing.

In the off-road travel trail storage/display at step 106 and step 117 in FIG. 4, the system counts the stored discrete vehicle point number $P_N$ (step 301), and calculates the storable remaining point number $P_{TR}$ ($=P_{MAX}-P_N$) (step 302). Here, $P_{MAX}$ is the maximum number of points. Next, assuming that the system stores the vehicle position discretely for every travel distance of 80 m and produces the travel trail data, the system calculates the storable remaining travel distance $D_{TR}$ with the following equation (step 303).

$$D_{TR}=80 \times P_{TR}$$

The system displays the remaining point number $P_{TR}$ and the remaining travel distance $D_{TR}$ on the monitor display (step 304).

(f) Edit Of The Address Book

The system is able to change the stored contents of the address book, and to add or delete telephone numbers. FIG. 11 is a display example of editing the address book.

Figures 11A, 11B, 11C, 11D, 11E, 11F, 11G:
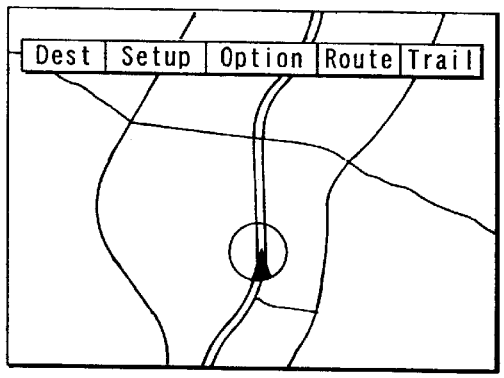
FIG. 11 is a display example of editing the Address Book.

To change or delete the address names (point names) registered in the address book memory 20, the user presses the menu button on the remote control unit to display the main menu on the screen (see FIG. 11(A)), and selects the menu item "Option" from the main menu. Thereby, the navigation control unit displays the screen "Select" for specifying an edit object as shown in FIG. 11(B). In this screen "Select", if the user selects the menu item "Edit Address Book" 60, the navigation control unit will display the screen "Select Name" in FIG. 11(C). In this screen "Select", the navigation control unit displays the point names registered in the address book in scrollable form, and the address of one point name is identified (highlighted) by the cursor or the menu bar. Here, in FIG. 11(C), since the point name HUT inside the off-road area is highlighted, which does not have the address, the address is not presented.

In this screen "Select Name", if the user selects the address name "HUT" to be modified or to be deleted and presses the Enter Key, the system will display the screen "Confirm Address" as shown in FIG. 11(D). Now, to change the address name or the telephone number, the user needs to select the menu item "Change Name & Phone Number", and to delete the address, the user needs to select the menu item "Delete from Address Book".

For example, in order to change the point name from "HUT" to "HUT OCOTILLO", in the screen "Confirm Address", the user selects the menu item "Change Name & Phone Number". Then, the system displays the screen "Input Name" as shown in FIG. 11(E), and the user inputs the point name "HUT OCOTILLO" with the keyboard displayed thereon (FIG. 11(F)) and selects the menu item "Save". Thereafter, the system displays the screen "Change Phone Number". The input of the phone number is made by using the keyboard. After inputting the phone number, to select "Done" will change the point name into a new one, and add a new telephone number (FIG. 11(G)).

(g) Destination Setting Processing

Figure 12:
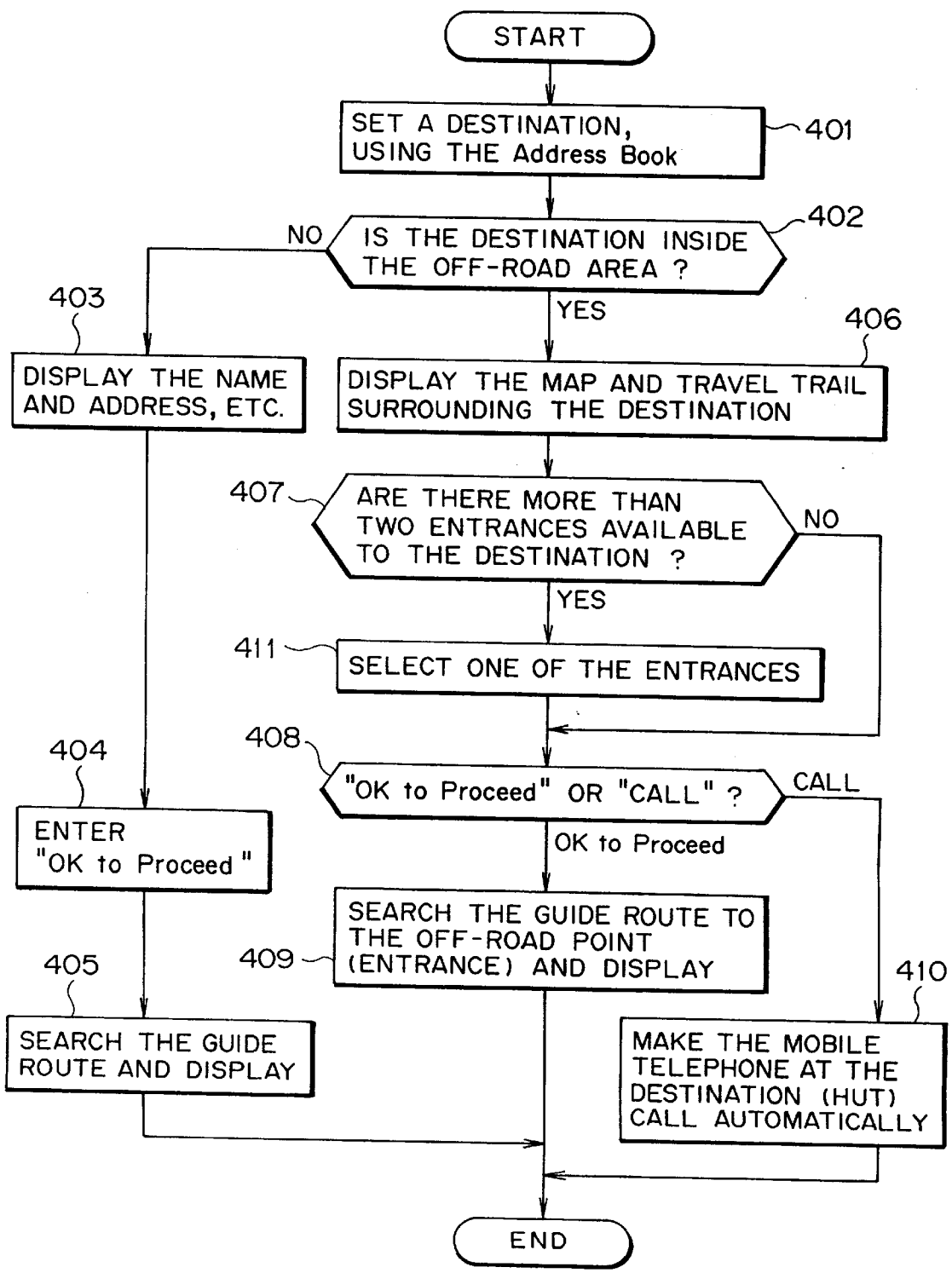
FIG. 12 is a flow chart of a destination setting.

FIG. 12 is a processing flow of a destination setting operation, and FIG. 13 is a display example of the destination setting operation by using the Address Book.

Figure 13A:
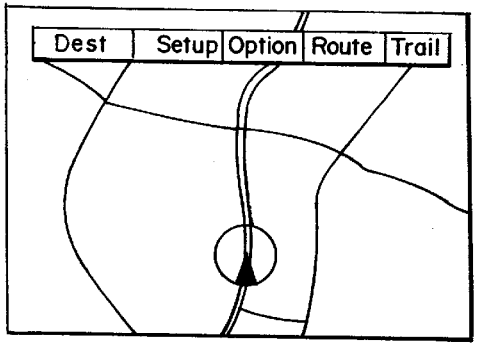
FIG. 13 is an explanatory chart of the method of inputting a destination by the Address Book.
Figure 13B:
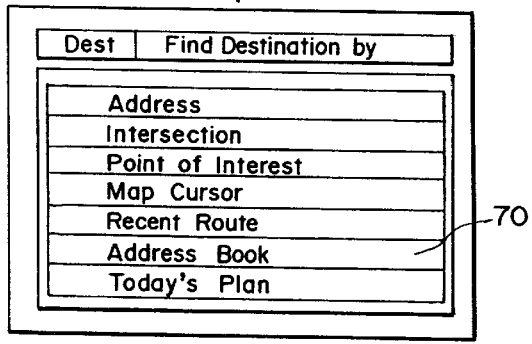
Figure 13C:
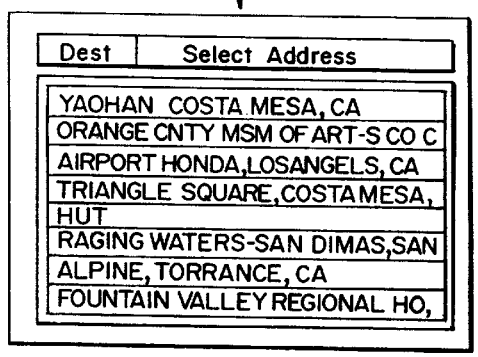
Figure 13D:
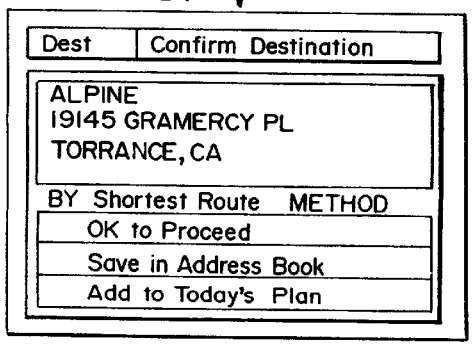

In order to input the destination with the address book that is stored in the address book memory 20, the user presses the menu button on the remote control unit to display the main menu on the screen (see FIG. 13(A)), and selects the menu item "Dest" from the main menu. The navigation system displays the screen "Find Destination By" for specifying the destination input method as shown in FIG. 13(B). Next, if the user selects the menu item "Address Book" 70, the navigation system will display the names of the addresses (point names) in scrollable form, which are registered in the Address Book, as shown in the screen "Select Address" in FIG. 13(C). If the user selects a desired address name (for example, ALPINE) (step 401), the system will check whether the address is a point inside the off-road area (step 402). If it is a point outside the off-road area, the system will display the selected address name and the address (step 403), as shown in the screen "Confirm Destination" in FIG. 13(D). If the point is correct as the destination, the user will select "OK to Proceed" in the screen "Confirm Destination" to set it as the destination (step 404). Thereafter, the navigation system searches and displays the guide route to the destination from the current position of the vehicle (step 405).

Figure 13E:
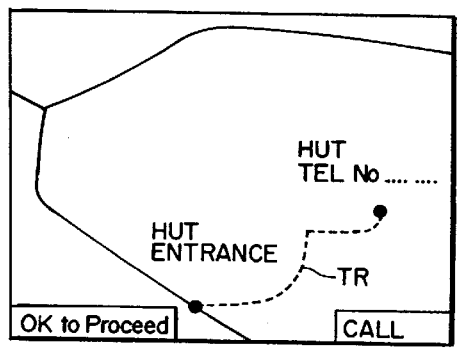

At step 402, if the selected address is a point inside the off-road area, using the map and the off-road travel trail data, the system will display the map surrounding the destination, the off-road travel trail TR, the point name (for example, "HUT")of the destination, the telephone number, etc., as shown in FIG. 13(E), (step 406). In this case, the system displays the name of the destination and the entrance (for example, "HUT ENTRANCE") at the off-road point.

Figure 13F:
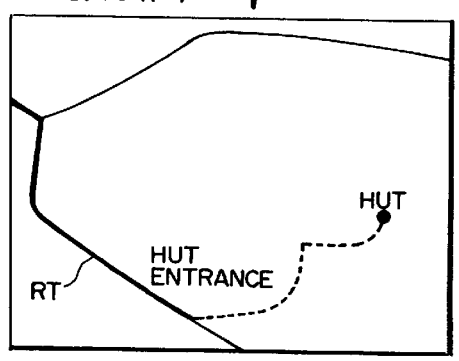

Next, referring to the off-road travel trail data, the system checks if there are two or more entrances (off-road point and on-road point) leading to the destination (step 407). If not, the user will select the menu item "OK to Proceed" or "CALL", according to whether the user is searching and displaying the travel route to the destination, or calling the destination (step 408). If the user selects the menu item "OK to Proceed", the system will locate the off-road point from the off-road travel trail data, and will search and display the route RT to the off-road point, as shown in FIG. 13(F) (step 409). If the user selects the menu item "CALL", the system will transmit the telephone number of the destination (HUT) to the automobile telephone, and cause it to call automatically (step 410).

Figure 13G:
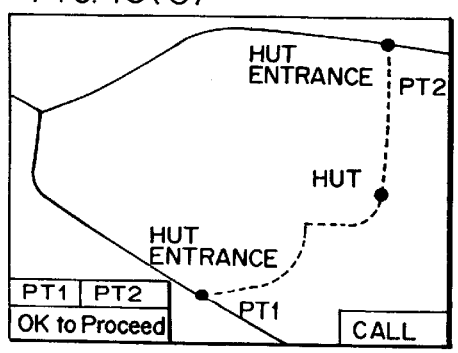

At step 407, if there are two or more entrances PT1, PT2 leading to the destination (see FIG. 13(G)), the system will display the menu item PT1, PT2 to let the user select one entrance (step 411). Thereafter, the system executes the processing after step 408.

In the above case, the system displays the menu item "TRAIL" during traveling. However, it is also possible to configure the system such that the system does not display the menu item "TRAIL" during normal travel, but automatically displays the menu item "TRAIL" when the vehicle goes off-road, to thereby let the driver recognize he is now traveling off-road.

Also in the above case, the vehicle position data (coordinates of longitude and latitude) are obtained discretely at the rate of one for each 80 m of travel up to the maximum point number. However, it is possible to make the rate variable; for example, it is possible to set the rate for each 40 m or 60 m in the case of making the point spacing more dense, or to set the rate for each 160 m or 320 m in the case of making the point spacing less dense. Further, it is possible to store the discrete position data at a constant time interval instead of at a constant distance, for example, at each 30 seconds, and it is also possible to control the stored spacing of the data in accordance with the degree of curves.

According to the invention as described above, since the system is designed to store off-road travel trails, the user is able to read out and display the off-road travel trails afterwards.

Further according to the invention, the user sets whether to generate the off-road travel trail data automatically or to generate the data by an instruction from the user. When the setting is automatic and the vehicle is in the off-road state, the system is designed to automatically generate and store the off-road travel trail data from the off-road point to the on-road point. Therefore, the system provides enhanced maneuverability and securely stores the off-road travel trail.

Further according to the invention, when the setting is to generate the off-road travel trail data by an instruction from the user, the off-road travel trail data are stored only when instructed. The system does not produce the travel trail data when the vehicle is in an area where the travel trail is not needed to be stored, such as shopping malls, public gardens, etc. The system therefore achieves effective use of the memory and, in addition, does not store unnecessary travel trail data, and the user is able to easily retrieve and/or edit the data afterwards.

Further according to the invention, when the user travels along an off-road travel trail and the vehicle position deviates (branches) from the off-road travel trail, since the system can produce the position data of the branch point and the travel trail data after branching in association with the name of the branch point, and to store them in the storage unit, the user is able to input the branch point and search the destination afterwards.

Further according to the invention, since the system is made to register an off-road point and an on-road point as an off-road entrance, by the user selecting either one of them, the system is able to search and display the guide route to a specific off-road entrance.

Further according to the invention, the system is made to register an off-road travel trail in association with the destination of an off-road travel or the place name being a transit point. Therefore, the system enables the user to set the destination easily from a list of place names, and to display the map and the travel trail surrounding the destination thus set.

Further according to the invention, by the user selecting the destination of an off-road travel or the place name of a transit point and instructing a call, the system causes the automobile telephone to call a facility at that point. Therefore, the user is able to call facilities inside the off-road area with an easy operation.

Further according to the invention, the system can be made to monitor the remaining capacity of the memory to store travel trail data, and to display the remaining capacity by means of a storable remaining point number or a storable remaining distance. Therefore, the user is able to delete unnecessary off-road travel trail data by editing, when the remaining memory capacity diminishes, and to store only the necessary trail data.

As many widely different embodiments of the present invention can be made without departing from the spirit and scope thereof, it is to be understood that the invention is not limited to the specific embodiments thereof except as defined in the appended claims.

What is claimed is:

1. A navigation system that displays a map and a vehicle position mark on a display screen, comprising:
    a position measurement unit that detects the vehicle position;
    a monitoring unit that monitors whether the vehicle position deviates from a road so as to be in an off-road state;
    a travel trail generating unit that generates off-road travel trail data, when the vehicle is in the off-road state; and
    a storage unit that stores the travel trail data.

2. A navigation system as claimed in claim 1, comprising a setting unit that sets whether to automatically generate the off-road travel trail data, or to generate the trail data by an instruction from a user, wherein, when the setting unit sets the automatic generation and the vehicle is in the off-road state, the travel trail generating unit automatically generates the off-road travel trail data and stores the data in the storage unit.

3. A navigation system as claimed in claim 2, wherein the monitoring unit monitors whether the vehicle position returns to the road, and the travel trail generating unit automatically generates the travel trail data from an off-road point to an on-road point.

4. A navigation system as claimed in claim 3, wherein the travel trail generating unit generates, as the off-road travel trail data, the position data of a point where the vehicle position enters off-road, discrete vehicle position data for each specific travel distance, and the position data of a point where the vehicle position returns on-road, and stores the data in the storage unit.

5. A navigation system as claimed in claim 1, comprising a point setting unit that sets a point associated with an off-road travel, wherein the travel trail generating unit generates the position data of the point and the travel trail data in association with the name of the point and stores the data in the storage unit.

6. A navigation system as claimed in claim 2, wherein, when the setting unit sets the generation by the instruction from the user, the travel trail generating unit begins to generate the off-road travel trail data by a generation starting instruction, and terminates the generation of the off-road travel trail data by a generation terminating instruction, and stores the data in the storage unit.

7. A navigation system as claimed in claim 6, wherein the travel trail generating unit stores in the storage unit the off-road travel trail data including the position data of the point associated with an off-road travel and discrete vehicle position data for each specific travel distance, in association with the name of the point where the vehicle is located, which was inputted on the generation starting instruction or on the generation terminating instruction.

8. A navigation system as claimed in claim 5 or claim 7, comprising a display unit that displays a list of the names of points stored in the storage unit, and displays a map surrounding a point selected from the list, an off-road travel trail, and the name of the point.

9. A navigation system as claimed in claim 8, comprising a route search unit that, when a point is set as a destination, searches a route to the off-road point stored in association with the name of the point.

10. A navigation system as claimed in claim 8, wherein when the point was set as a destination, when the off-road point and the on-road point are stored in association with the name of the point, the navigation system comprising a selection unit that selects either one of the points, wherein the route search unit searches a route to the selected point.

11. A navigation system as claimed in claim 8, comprising, when the point was set as a receiving station for a telephone, an input unit that inputs the telephone number stored in association with the name of the point to the telephone.

12. A navigation system as claimed in claim 1, comprising a setting unit that sets whether or not to display an off-road travel trail stored in the storage unit superimposed with the map.

13. A navigation system as claimed in claim 1, wherein, when the vehicle travels along the off-road travel trail, the monitoring unit monitors whether the vehicle position deviates from the off-road travel trail, and when the vehicle deviates from the off-road travel trail, the travel trail generating unit regards a point where the vehicle position deviates from the off-road travel trail as a branch point, and generates position data of the branch point in association with a name of the branch point and travel trail data after branching and stores the data in the storage unit.

14. A navigation system as claimed in claim 1, comprising a display unit that monitors a number of remaining points that can be stored, and displays the number of points or the corresponding travel distance, when the storage unit is able to store a specific number of discrete vehicle position data for each specific travel distance as the travel trail data.

15. A method of operating a navigation system that displays a map and a vehicle position mark on a display screen, comprising:
    detecting the vehicle position;
    monitoring whether the vehicle position deviates from a road so as to be in an off-road state;

generating off-road travel trail data, when the vehicle is in the off-road state; and storing the travel trail data.

16. A method as claimed in claim 15, further comprising: setting whether to generate the off-road travel trail data automatically when the vehicle is in the off-road state, or to generate the trail data by an instruction from a user.

17. A method as claimed in claim 16, wherein, in the automatic setting, the travel trail data is automatically generated from an off-road point to an on-road point.

18. A method as claimed in claim 17, wherein the generated off-road travel trail data includes the position data of a point where the vehicle position enters off-road, discrete vehicle position data for each specific travel distance, and the position data of a point where the vehicle position returns on-road.

19. A method as claimed in claim 15, further comprising: setting a point associated with an off-road travel, by generating the position data of the point and storing the travel trail data in association with the name of the point.

20. A method as claimed in claim 16, wherein, when the trail data is generated by the instruction from the user, the off-road travel trail data begins to be generated by a generation starting instruction received from the user and stops being generated by a generation terminating instruction received from the user.

21. A method as claimed in claim 20, wherein the off-road travel trail data includes discrete vehicle position data for each specific travel distance between the receipt of the generation starting instruction and the generation terminating instruction.

22. A method as claimed in claim 19, further comprising: displaying a list of the names of points, selecting a point, and displaying a map surrounding the selected point, an off-road travel trail, and the name of the selected point.

23. A method as claimed in claim 22, further comprising: selecting the point as a destination and searching a route to the selected point.

24. A method as claimed in claim 22, further comprising: when the point is set as a receiving station for a telephone, entering the telephone number stored in association with the name of the point to the telephone.

25. A method as claimed in claim 15, further comprising: setting whether or not to display a stored off-road travel trail superimposed with the map.

26. A method as claimed in claim 15, wherein, when the vehicle travels along the off-road travel trail, monitoring whether the vehicle position deviates from the off-road travel trail, and when the vehicle deviates from the off-road travel trail, identifying a point where the vehicle position deviates from the off-road travel trail as a branch point, and generating position data of the branch point and travel trail data after branching, and storing the data.

27. A method as claimed in claim 15, further comprising: monitoring a number of remaining points that can be stored, and displaying the number of points or the corresponding travel distance, when the system is able to store a specific number of discrete vehicle position data for each specific travel distance as the travel trail data.

* * * * *